(12) United States Patent
Chen

(10) Patent No.: US 8,248,524 B2
(45) Date of Patent: Aug. 21, 2012

(54) IMAGE CAPTURING DEVICE

(75) Inventor: Shi-Ying Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 308 days.

(21) Appl. No.: 12/753,124

(22) Filed: Apr. 2, 2010

(65) Prior Publication Data

US 2011/0051374 A1  Mar. 3, 2011

(30) Foreign Application Priority Data

Aug. 28, 2009  (CN) .......................... 2009 1 0306298

(51) Int. Cl.
*H04N 5/225* (2006.01)

(52) U.S. Cl. ....................................................... 348/374

(58) Field of Classification Search .................... 348/374
See application file for complete search history.

(56) References Cited

U.S. PATENT DOCUMENTS

| 5,216,250 | A | * | 6/1993 | Pellegrino et al. | ........ 250/370.09 |
| 7,554,702 | B2 | * | 6/2009 | Maruta et al. | .................. 358/474 |
| 7,821,554 | B2 | * | 10/2010 | Ma et al. | ....................... 348/294 |
| 7,933,516 | B2 | * | 4/2011 | Iyoda et al. | .................... 396/535 |
| 2004/0169771 | A1 | * | 9/2004 | Washington et al. | ......... 348/374 |
| 2006/0056049 | A1 | * | 3/2006 | Tokiwa et al. | ................. 359/684 |
| 2009/0008669 | A1 | * | 1/2009 | Maeda et al. | .................... 257/98 |

FOREIGN PATENT DOCUMENTS

| CN | 1252682 A | 5/2000 |
| CN | 2465330 Y | 12/2001 |
| TW | M264525 U | 5/2005 |

* cited by examiner

*Primary Examiner* — James Hannett
(74) *Attorney, Agent, or Firm* — Altis Law Group, Inc.

(57) ABSTRACT

An image capturing device a circuit base, an image sensor, a cooling member, and an elastic member. The image sensor is disposed on the circuit base. The circuit board defines a first opening covered by the image sensor. The elastic member is interposed between the circuit board and the cooling member. The elastic member comprises a bulged elastic flange running through the first opening and compressively abutting against the image sensor and the circuit board and an elastic arm bent towards the cooling member and elastically abutting against the cooling member.

9 Claims, 3 Drawing Sheets

IMAGE CAPTURING DEVICE

BACKGROUND

1. Technical Field

The present disclosure relates to an image capturing devices and, particularly, to an image capturing device having high efficiency in heat dissipation.

2. Description of the Related Art

Nowadays, because of advances in micro-circuitry and multimedia technology, image capturing devices are now in widespread use, such as Digital Video (DV) or video recorders. However, during a long time of capturing image, the image sensor will generate a lot of heat. Nowadays, heat dissipating efficiency of image capturing devices is still less than satisfactory.

Therefore, it is desirable to provide an image capturing device which can overcome the above-mentioned problems.

BRIEF DESCRIPTION OF THE DRAWINGS

Many aspects of the present image capturing device could be better understood with reference to the accompanying drawings. The components in the drawings are not necessarily drawn to scale, the emphasis instead being placed upon clearly illustrating the principles of the image capturing device. Moreover, in the drawings, like reference numerals designate corresponding parts throughout the several views.

DETAILED DESCRIPTION

Figure 1:
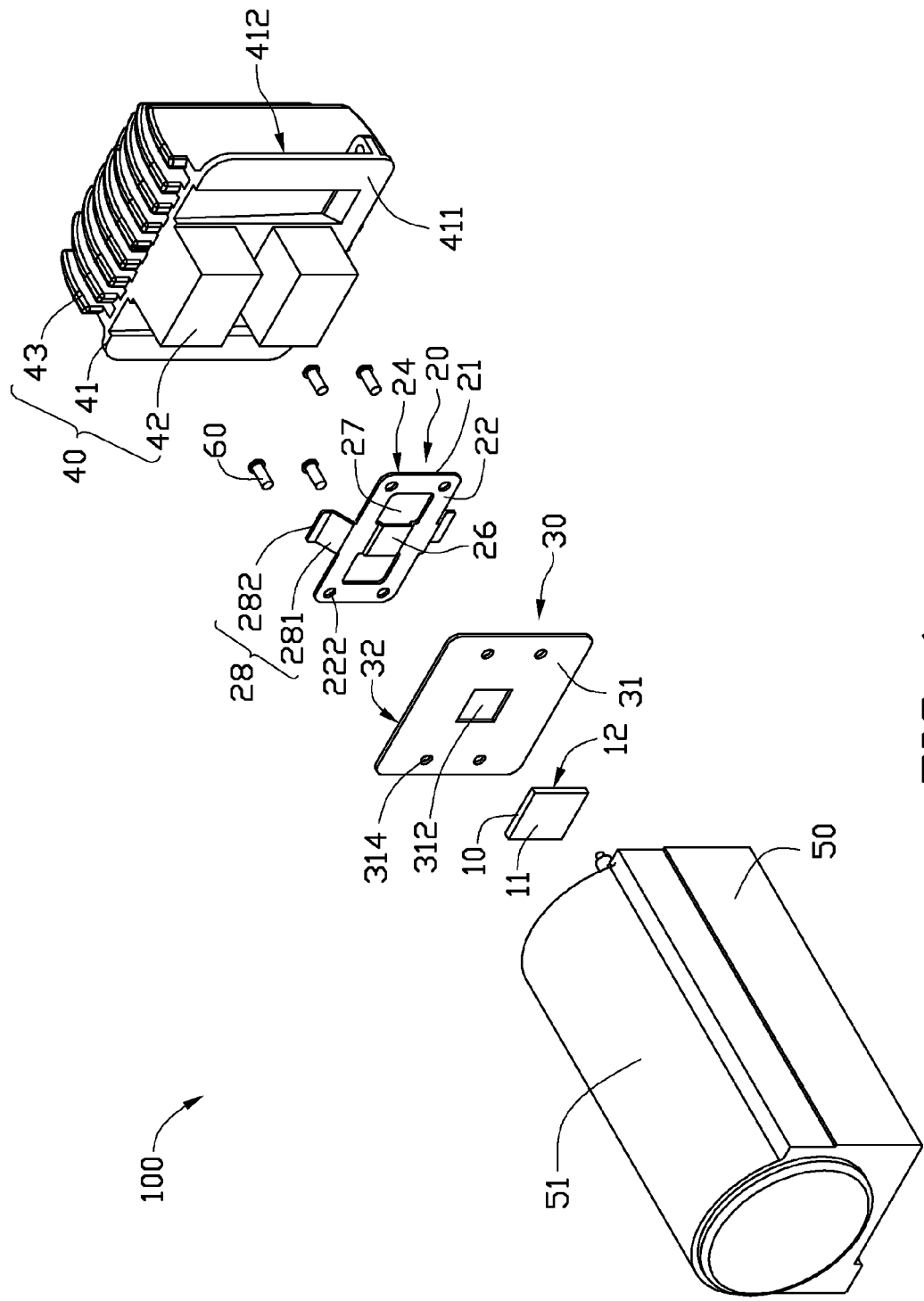
FIG. 1 is an exploded, isometric view of an image capturing device, according to an exemplary embodiment.
Figure 2:
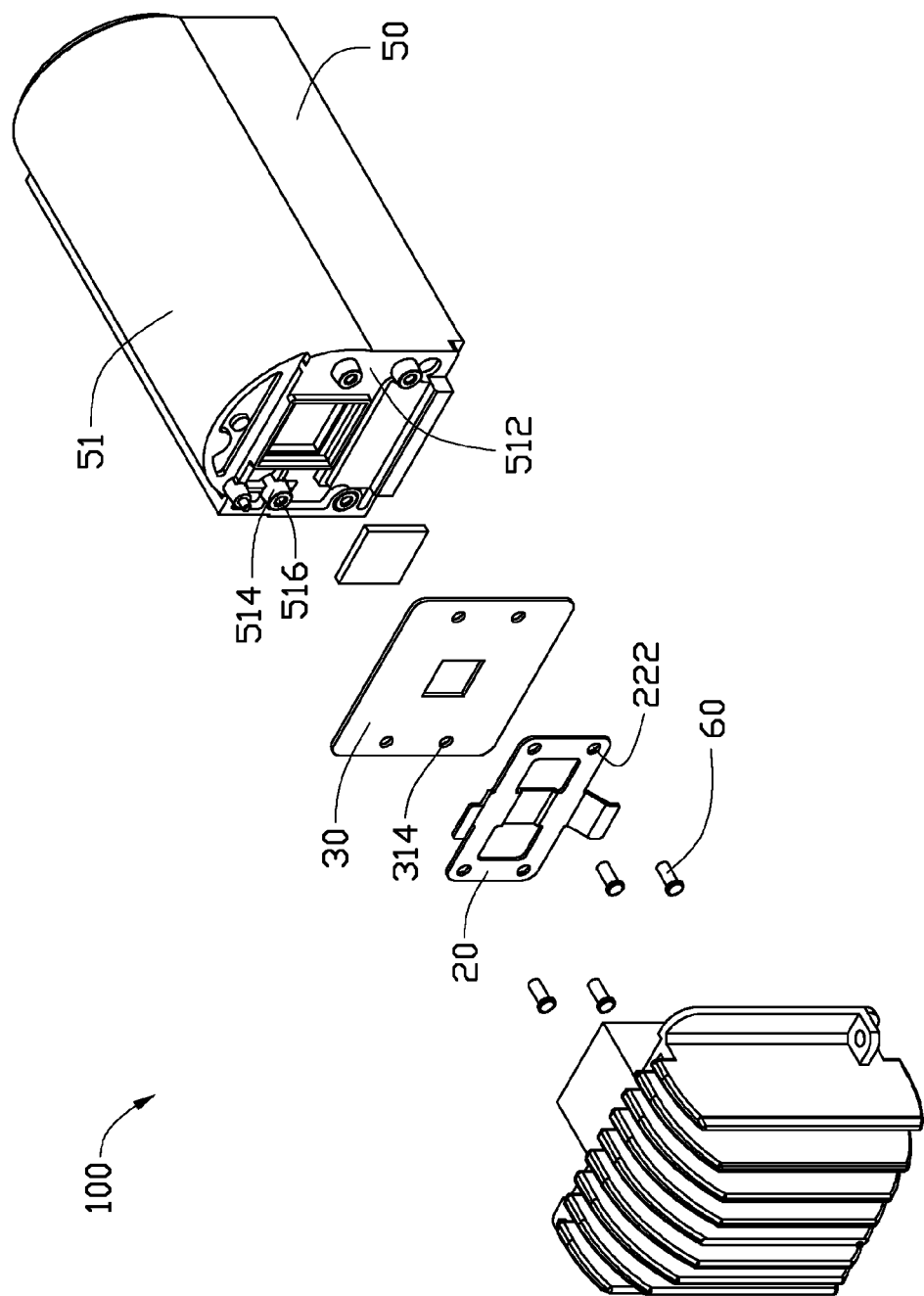
FIG. 2 is similar to, but shown from another angle.

Referring to FIGS. 1 and 2, an image capturing device 100, according to an exemplary embodiment, includes an image sensor 10, a circuit board 30, a cooling member 40, a lens module 50, and a shell (not shown). The image sensor 10, the circuit board 30, and the lens module 50 all are received in the shell. The image sensor 10 is disposed on the circuit board 30. The heat generated by the image sensor 10 and the circuit board 30 transmits to the cooling member 40. The cooling member 40 partially protrudes out of the shell and exposed to dissipate the heat from the interior of the shell to outside. The image capturing device 100 may be, for example, a video recorder or a digital video (DV), in the present embodiment, the image capturing device 100 is a DV.

The image sensor 10 is a charged coupled device (CCD), or a complementary metal-oxide-semiconductor transistor (CMOS). In the present embodiment, the image sensor 10 is a CCD. The image sensor 10 is configured to convert light signals into digital electrical signals. The image sensor 10 includes a first surface 11 and a second surface 12 opposite to the first surface 11. The first surface 11 has a photosensitive area (not shown).

In the present embodiment, the image capturing device 100 further includes an elastic member 20. The elastic member 20 is made of a metallic material, such as aluminum, magnesium, or aluminum-magnesium alloy. In the present embodiment, the elastic member 20 is made of aluminum-magnesium alloy. The elastic member 20 includes an elastic plate 21. The elastic plate 21 is rectangular and includes a supporting surface 22 and a bottom surface 24 facing away from the supporting surface 22. Each corner of the elastic plate 21 defines a first threaded hole 222. A bulged flange 26 bulges upwardly from a central portion of the supporting surface 22 for supporting the image sensor 10. The bulged flange 26 is substantially an elongated plate extending along the widthwise direction of the elastic plate 21. Two openings 27 are respectively defined at two widthwise sides of the bulged flange 26 and are substantially symmetrical with each other about the bulged flange 26. The elastic member 20 further includes two elastic arms 28 extending away from the central portion of two opposite longer sides of the elastic plate 21 respectively. The elastic arms 28 are integrally formed with the elastic plate 21. Each of the elastic arms 28 includes an extending portion 281 and a supporting portion 282. The extending portions 281 extend from the longer sides of the elastic plate 21 respectively and are bent towards the bottom surface 24 at an angle to the elastic plate 21. The supporting portions 282 extend outwards from distal ends of the extending portions 281 along a direction substantially parallel to the elastic plate 21.

The circuit board 30 includes an upper surface 31 and a lower surface 32 facing away from the upper surface 31. The circuit board 30 defines a first opening 312 shaped corresponding to the bulged flange 26 of the elastic member 20 to allow the bulged flange 26 to position therethrough. The circuit board 30 is disposed on the supporting surface 22 of the elastic member 20 and the bulged flange 26 goes through the first opening 312. The circuit board 30 is electrically coupled to the image sensor 10 by one of the following processes, a chip-scale packaging process, a wafer-level chip-scale packaging process, a ceramic leaded packaging process, a plastic leadless chip packaging process, a thermal compression bonding process, or a flip chip packaging process, for example. In the present embodiment, the circuit board 30 is electrically coupled to the image sensor 10 by a chip-scale packaging process. Each corner of the circuit board 30 defines a second threaded hole 314 aligned with the first threaded hole 314.

It should be noted that, the arrangement of the image capturing device 100 is not limited to the present embodiment, the image sensor 10 also can be directly disposed on and electrically coupled to the supporting surface 31 of the circuit board 30, therefore, omitting the elastic member 20.

The cooling member 40 is made of a high thermal conductive material, such as aluminum, magnesium or aluminum-magnesium alloy. In the present embodiment, the cooling member 40 is made of aluminum. The cooling member 40 includes a substrate 41, two blocks 42, and a number of fins 43. The substrate 41 includes a first side surface 411 and a second side surface 412 facing away from the first side surface 411. The two blocks 42 are disposed on the first side surface 411. The fins 43 are disposed on the second side surface 412 and all substantially perpendicular to the second side surface 412.

The lens module 50 includes a lens barrel 51 and a number of lenses (not shown) received in the lens barrel 51. The lens barrel 51 includes an image surface 512 facing to a first surface 11 of the image sensor 10. Four protrusions 514 are integrally formed with and extend upward from the image surface 512. Alternatively, the four protrusions 512 and the lens barrel 51 may be separately formed. The protrusions 514 can be attached to the lens barrel 51 by adhesive, welding (e.g., plastic welding), or other combination methods. All of the protrusions 514 have essentially identical height. The four protrusions 514 are respectively located on the four corners of the image surface 512. Each of the protrusions 514 defines a screw-receiving portion 516.

Figure 3:
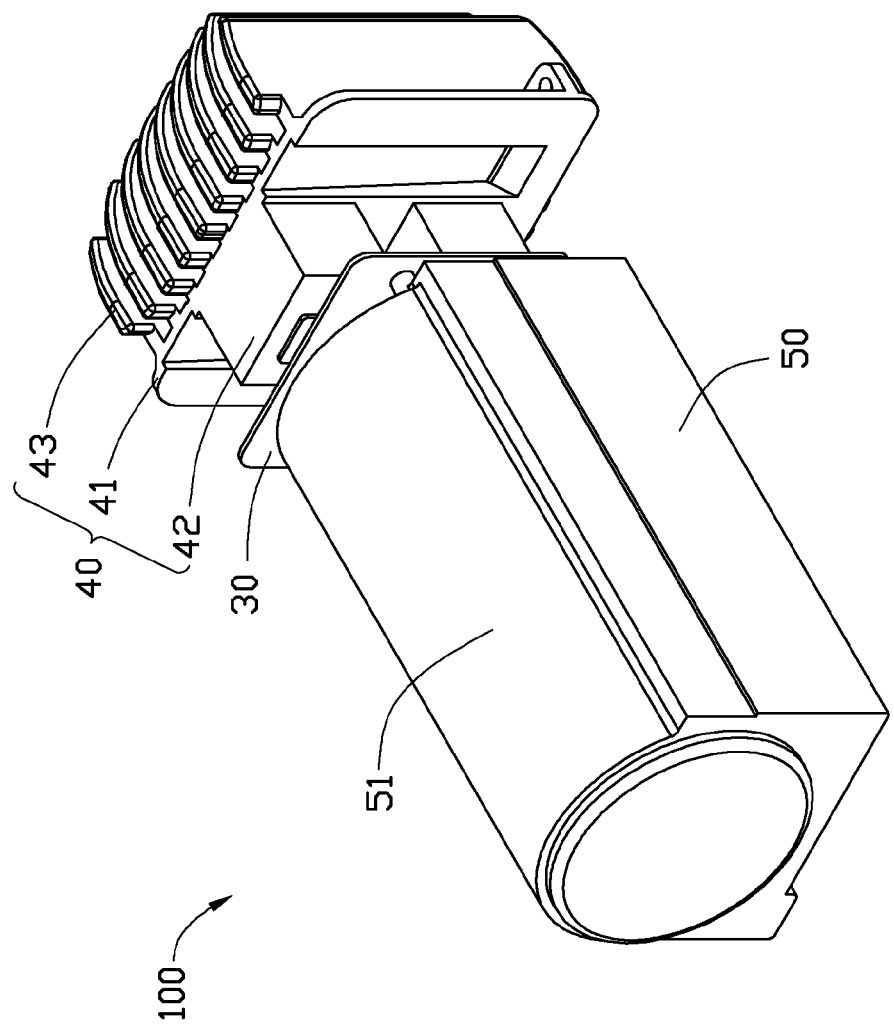
FIG. 3 is an assembled, isometric view of the image capturing device of FIG. 1.

Also referring to FIG. 3, in assembly, the assembled elastic member 20, the circuit board 30, and the image sensor 10 are assembled to the image surface 512 of the lens barrel 51 via four screws 60 passing through the first threaded hole 222, the second threaded hole 314 and threadedly engaged with a corresponding screw-receiving portion 516. The cooling assembly 40 and the assembled lens barrel 51, the elastic member 20, the circuit board 30, and the image sensor 10 are held in the shell with the two blocks 42 abutted with the supporting portion 282 of the elastic arms 28, and the fins 43 protruding out of the shell.

In use, the bulged flange 26 abuts with the image sensor 10 and the circuit board 30, and the elastic arms 28 abut with the blocks 42 of the cooling assembly 40 respectively, providing a high efficient heat dissipating passage for the image sensor 10 and the circuit 30. As such, the heat generated by the image sensor 10 and the circuit 30 is efficiently transmitted to the cooling member 40 via the elastic member 20 and thus are efficiently dissipated. In addition, the bulged flange 26 and the elastic arms 28 can be elastically deformed when the image capturing device 100 is dropped, to function as a cushion for the image sensor 10.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An image capturing device comprising:
   a circuit board defining a first opening;
   an image sensor disposed on the circuit base;
   a cooling member; and
   an elastic member interposed between the circuit board and the cooling member, the elastic member comprising a bulged elastic flange running through the first opening and compressively abutting against the image sensor and the circuit base, and an elastic arm bent towards the cooling member and elastically abutting against the cooling member, two openings respectively defined at two widthwise sides of the bulged elastic flange and being substantially symmetrical with each other about the bulged elastic flange.

2. The image capturing device as claimed in claim 1, wherein the elastic member further comprises an elastic plate comprising a supporting surface and a bottom surface, the bulged elastic flange bulges upwardly from a center portion of the supporting surface for supporting the imager sensor.

3. The image capturing device as claimed in claim 1, wherein the elastic member is made of aluminum, magnesium or aluminum-magnesium alloy.

4. The image capturing device as claimed in claim 2, wherein each of the elastic arms comprises an extending portion and supporting portion, the extending portions extend from the longer side of the elastic plate respectively and are bent towards the bottom surface of the elastic plate at an angle to the elastic plate, the extending portion extend outwards from distal end of the extending portions along a direction substantially parallel to the elastic plate.

5. The image capturing device as claimed in claim 4, wherein the elastic arms are integrally formed with the elastic plate.

6. The image capturing device as claimed in claim 4, wherein the cooling member comprises a substrate, two blocks and a number of fins, the substrate comprises a first side surface and a second side surface facing away from the first side surface, the two blocks are disposed on the first side surface and abutted with the supporting portion of the elastic arms, the fins are disposed on the second side surface and all substantially perpendicular to the second side surface.

7. The image capturing device as claimed in claim 1, further comprising a shell for receiving the image sensor, the circuit board, and the cooling member, the fins of the cooling member protruding out of the shell.

8. The image capturing device as claimed in claim 2, further comprising a lens module, wherein the elastic member is rectangular, each corner of the elastic plate defines a first threaded hole, each corner of the circuit board defines a second threaded hole aligned with the first threaded hole, the lens module comprises a lens barrel and a plurality of lenses received in the lens barrel, the lens barrel comprises an image surface, four protrusions are integrally formed with and extend upward from the image surface, each of the protrusions defines a screw-receiving portion, the assembled elastic member, the circuit base, and the image sensor are assembled to the image surface of the lens barrel via four screws passing through the first and second threaded holes, and threadedly engaging with a corresponding screw-receiving portion.

9. The image capturing device as claimed in claim 1, being a video recorder or a digital video.

* * * * *